United States Patent [19]

Gomez et al.

[11] 4,143,108

[45] Mar. 6, 1979

[54] METHOD OF INJECTION MOLDING NITRILE ARTICLES

[75] Inventors: I. Luis Gomez, Longmeadow, Mass.; Edward Foden, North Granby, Conn.

[73] Assignee: Monsanto Company, St. Louis, Mo.

[21] Appl. No.: 717,590

[22] Filed: Aug. 26, 1976

[51] Int. Cl.² .......................... B29B 1/06; B29F 3/06
[52] U.S. Cl. .................................... 264/102; 264/328; 425/203
[58] Field of Search ................. 264/176 R, 94, 97, 98, 264/102, 328; 222/238, 56, 415; 425/147, 203, 205

[56] References Cited

U.S. PATENT DOCUMENTS

| | | | |
|---|---|---|---|
| 3,481,001 | 12/1969 | Stillhard | 425/203 |
| 3,499,073 | 3/1970 | Sun | 264/176 F |
| 3,563,514 | 2/1971 | Shattuck | 425/205 |
| 3,642,752 | 2/1972 | Sutter | 425/203 |
| 3,754,851 | 8/1973 | Reilly et al. | 264/98 |
| 3,826,477 | 7/1974 | Kunogi et al. | 425/203 |
| 3,848,041 | 11/1974 | Adomaitis | 264/98 |
| 3,913,796 | 10/1975 | Aoki | 222/238 |
| 3,992,500 | 11/1976 | Kruder et al. | 425/203 |

OTHER PUBLICATIONS

"Advances in Dry Blend Extrusion," N. T. Flathers et al. Modern Plastics, vol. 38, p. 210 5/1961.

*Primary Examiner*—Jay H. Woo
*Attorney, Agent, or Firm*—Michael J. Murphy

[57] ABSTRACT

An improved method for forming thermoplastic articles from high nitrile polymers by injection molding which method comprises initially charging the high nitrile polymer to a vacuum hopper system wherein a vacuum is applied and from which it is fed to a reciprocating screw injection molding machine for formation of said articles.

11 Claims, No Drawings

METHOD OF INJECTION MOLDING NITRILE ARTICLES

BACKGROUND OF THE INVENTION

This invention relates to an improved method for injection molding nitrile articles. More particularly, the present invention is directed to the injection molding of articles made of high nitrile polymers wherein said polymer is first charged to a vacuum hopper system for application of a vacuum from which it is fed into a reciprocating screw injection molding machine wherein the article is formed.

While the injection molding of plastic materials is generally well known and has grown with the increased use and new application found for such products, it is a complex technology with many overlapping and interrelating facets. High nitrile polymers possess a number of chemical and physical properties which make them attractive for use in a variety of packaging application, particularly molded containers such as bottles, cans and jars. However, such materials generally have relatively high melt viscosities and therefore are not particularly well suited for injection molding. By careful control of conditions, such polymers can be injection molded, however, the thermal sensitivity of nitrile polymers make it extremely difficult to attain and control the desired optical properties, i.e. color, clarity and haze.

The use of vacuum hoppers in extrusion processes has been known for a number of years as disclosed in "Vacuum Hopper Extrusion" by N. T. Flathers et al, Modern Plastics, v. 37, p. 105, Apr. 1960 and "Advances in Dry Blend Extrusion" by N. T. Flathers et al, Modern Plastics, v. 38, p. 210, May 1961. Such techniques have not been considered as popular or efficient as venting techniques and do not appear to be attractive to injection molding operations and particularly those involving reciprocating screw injection molding machines because of the difficulty in adapting and maintaining such a system.

SUMMARY OF THE INVENTION

Now in accordance with the method of this invention, it was found that the use of a vacuum hopper system in an injection molding operation involving the formation of high nitrile articles surprisingly resulted in a significant reduction in the injection molding cycle time as well as overcoming or minimizing the problems relating to the attainment of desired optical properties. This reduction in overall injection molding cycle time can be particularly significant when the formed articles are to be further converted into containers such as bottles through subsequent fabrication steps. Items of this type are often produced commercially in high volume and the economics of the overall process can be improved to a substantial extent by the more effective utilization of the injection molding equipment.

The present invention comprises an improvement in the method for injection molding high nitrile polymers wherein polymers containing from about 50 to about 90% by weight of nitrile monomer units (calculated as acrylonitrile) based on the total polymer weight are initially charged to a vacuum hopper system where a vacuum is applied and from which it is directly fed to a reciprocating screw injection molding machine for formation of the article.

DETAILED DESCRIPTION OF THE INVENTION

This invention involves an improved method for injection molding high nitrile polymer articles. The high nitrile polymers used in this invention will generally comprise from about 50 to about 90% and preferably from about 55 to about 85% by weight of nitrile monomer units (calculated as acrylonitrile) based on the total polymer weight of at least one nitrile having the formula:

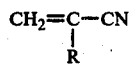

wherein R is hydrogen or a lower alkyl having 1 to 4 carbon atoms. Such compounds include acrylontrile, methacrylonitrile, ethacrylonitrile, propacrylonitrile, etc. The most preferred olefinically unsaturated nitriles are acrylonitrile and methacrylonitrile and mixtures thereof.

The nitrile composition of this invention may contain a comonomer material copolymerizable with the olefinically unsaturated nitriles and including:

(a) the monovinylidene aromatic hydrocarbon monomers of the formula:

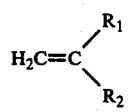

wherein $R_1$ is hydrogen, chlorine or methyl and $R_2$ is an aromatic radical of 6 to 10 carbon atoms which may also contain substituents such as halogen and alkyl groups attached to the aromatic nucleus, e.g. styrene, alpha methyl styrene, vinyl toluene, alpha chlorostyrene, ortho chlorostyrene, meta chlorostyrene, para-chlorostyrene, ortho methyl styrene, para methyl styrene, ethyl styrene, isopropyl styrene, dichloro styrene, vinyl naphthalene, etc.

(b) lower alpha olefins of from 2 to 8 carbon atoms, e.g. ethylene, propylene, isobutylene, butene-1, pentene-1 and their halogen and aliphatic substituted derivatives e.g. vinyl chloride, vinylidene chloride, etc.

(c) acrylic acid and methacrylic acid and the corresponding acrylate and methlacrylate esters having alkyl groups containing 1 to 4 carbon atoms, e.g. methyl acrylate, ethyl acrylate, propyl acrylate, methyl methacrylate, etc.

(d) vinyl esters of the formula:

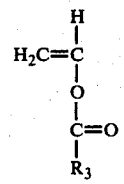

wherein $R_3$ is hydrogen, an alkyl group of from 1 to 10 carbon atoms, or an aryl group of 6 to 10 carbon atoms including the carbon atoms in ring substituted alkyl substituents, e.g. vinyl formate, vinyl acetate, vinyl propionate, vinyl benzonate, etc.

(e) vinyl ether monomers of the formula:

$H_2C=CH-O-R_4$ wherein $R_4$ is an alkyl group of from 1 to 8 carbon atoms, an aryl group of from 6 to 10 carbon atoms or a monovalent aliphatic radical of from 2 to 10 carbon atoms, which aliphatic radical may be hydrocarbon or oxygen-containing, i.e. an aliphatic radical with either linkages and may also contain other substituents such as halogen, carbonyl, etc. Examples of these monomeric vinyl ethers include vinyl methyl ether, vinyl ethyl ether, vinyl-n-butyl ether, vinyl 2-chloroethyl, vinyl phenyl ether, vinyl cyclohexyl ether p-butyl cyclohexyl ether, vinyl ether of p-chlorophenylene glycol, etc.

Other useful comonomers in the practice of this invention are those comonomers which contain a mono- or di-nitrile function. Examples of these include methylene glutaronitrile, 2,4-dicyanobutene-1, vinylidene cyanide, crotonitrile, fumarodinitrile, maleodinitrile.

The preferred comonomers are the monovinylidene aromatic hydrocarbons and particularly styrene.

This invention also contemplates the use of a synthetic or natural rubber component such as polybutadiene, isoprene, neoprene, nitrile rubbers, natural rubbers, acrylonitrile-butadiene copolymers, ethylene-propylene copolymers, chlorinated rubbers, etc., which are used to strengthen or toughen packaging materials prepared from this invention. This rubbery component may be incorporated into the acrylonitrile containing polymer by any of the methods which are well known to those skilled in the art, e.g. direct polymerization of monomers, polyblends, grafting the acrylonitrile monomer mixture onto the rubbery backbone, physical admixtures of the rubber component, etc. Especially preferred are polyblends derived by mixing a graft copolymer of the acrylonitrile and comonomer on the rubber backbone with another copolymer of acrylonitrile and the same comonomer. Generally, such rubber component may comprise from 0 to about 25% by weight of the nitrile polymer composition.

The vacuum hopper system as used in this invention includes any feed hopper system wherein vacuum conditions can be applied to the polymer feed before it is fed to the injection molding machine. Generally, it will comprise an enclosed hopper with properly sized pump means for applying the vacuum and automatic loading means for feeding the polymer from the outside without losing vacuum. Additional means are provided in the system for agitating and mixing the polymer when in the hopper. The extent of vacuum applied to the system can vary widely with about 20" Hg up to the maximum attainable (or about 29.9" Hg) being generally suitable for this process. More particularly vacuum conditions will vary from about 20 to about 29" Hg and preferably from about 25 to 29" Hg. The application of vacuums are well known in the art and further information concerning the application of such systems to the method of this invention may be found for example in the article "Vacuum Technology" in Kirk-Othmer Encyclopedia of Chemical Technology, Second Edition, Vol. 25, 1970, pages 123-157.

Reciprocating screw type injection molding machines are well known in the art as disclosed in "Injection Molding Theory and Practice" by I. Rubin, Chapter 1, 1972. Any of these conventionally well known machines may be readily adapted to the method of this invention.

While this method has been generally described as involving the formation of high nitrile articles, it is particularly adapted to the formation of tubular, elongated preforms having an open end and a closed end as described in detail in U.S. Pat. No. 3,900,120, issued Aug. 19, 1975. Such article or preform may be further formed as by blow molding into a container such as a bottle for use in packaging foods, beverages and medicines.

The nitrile polymers as used in this invention may be prepared by any of the known techniques of polymerization including solution, emulsion, suspension and bulk or mass polymerization. While the form of the polymer is not critical, this method is particularly suitable when the polymer is in powder form because of the hygroscopic nature of the material and its general sensitivity to environmental conditions.

The present invention also contemplates the use of other additives and ingredients in the polymer composition such as dyes, pigments, fillers, antioxidants, lubricants, etc. It is obvious that other modifications and alterations of the invention will be readily suggested to persons skilled in the art.

While the significant advantage of this invention resides in the overall reduction in injection molding cycle time as well as improved optical and color properties, other desirable features of this process includes improved cycle reproducibility, improved shot to shot uniformity, fewer gate fractures and other improvements as noted in the illustrative example.

The following example is given to illustrate the principles and practice of this invention and should not be construed as a limitation thereof.

EXAMPLE 1

A polymer composition comprising a 0/30 mixture by weight of acrylonitrile/styrene in powder form was charged to a closed vacuum hopper feed system and a vacuum of 26 to 28" Hg applied thereto with continuous agitation. The vacuum hopper system was connected to a reciprocating screw injection molding machine with screw operating at 40-45 RPM and polymer as noted was fed to the machine. A series of 85 gram injection molded tubular preforms were formed in the injection molding machine with the screw recovery time of the system being 26 seconds and the overall injection molding cycle being 44 seconds.

As a means of comparison, a similar run was made using the same composition and processing conditions without vacuum being applied. The results showed a screw recovery time and an overall injection molding cycle which were about 10% slower than that found when using the vacuum system. Additionally, optical properties were particularly better for the preforms formed using the vacuum system with yellowness showing a significant reduction of 20% (measured by Hunter Lab Colometer difference — yellowness + b value). Clarity and haze were also visually observed to be better for those preforms prepared using the vacuum system. Additionally surface conditions were notably better with the presence of splay marks, brown streaks, bubbles and voids found in the preforms prepared with vacuum being either completely absent of significantly reduced in comparison with the operation wherein vacuum was not applied.

What is claimed is:

1. In the method of forming a thermoplastic article from high nitrile polymers by injection molding, the improvement comprising charging a polymer in powder form containing from about 50 to about 90% by weight of nitrile monomer units calculated as acrylonitrile and based on the total polymer weight to a vacuum hopper system wherein vacuum is applied from which it is fed to a reciprocating screw injection molding machine for formation of said article, said vacuum resulting in a reduction of at least about ten percent in the recovery time of the screw in comparison with recovery time under the same conditions without vacuum.

2. The method of claim 1 wherein the polymer is forced by said reciprocating screw into a cavity conforming to the shape of an elongated tubular preform.

3. The method of claim 2 wherein the formed preform has a reduction in yellowness of at least twenty percent in comparison with a preform formed under the same condition without vacuum.

4. The method of claim 1 wherein a vacuum of about 20 to about 29.9" Hg is applied.

5. The method of claim 1 wherein said nitrile monomer comprises at least one monomer of the formula:

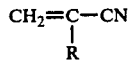

wherein R is hydrogen or lower alkyl of 1 to 4 carbon atoms.

6. The method of claim 3 wherein said nitrile monomer is acrylonitrile.

7. The method of claim 3 wherein said polymer includes a comonomer selected from the group consisting of:
(a) monovinylidene aromatic hydrocarbon monomers of the formula:

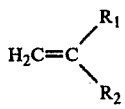

wherein $R_1$ is hydrogen, chlorine or methyl and $R_2$ is an aromatic radical of 6 to 10 carbon atoms;
(b) lower alpha olefins of 2 to 8 carbon atoms;
(c) acrylic and methacrylic acid and the alkyl esters of said acids wherein the alkyl group contains 1 to 4 carbon atoms;
(d) vinyl esters of the formula:

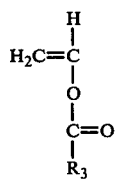

wherein $R_3$ is hydrogen, an alkyl group of 1 to 10 carbon atoms or an aryl group of 6 to 10 carbon atoms; and
(e) vinyl ether monomers of the formula:

wherein $R_4$ is an alkyl group of 1 to 8 carbon atoms, an aryl group of 6 to 10 carbon atoms or a monovalent aliphatic radical of 2 to 10 carbon atoms.

8. The method of claim 7 wherein said polymer is in powder form.

9. The method of claim 8 wherein a vacuum of about 20 to about 29.9" Hg is applied.

10. The method of claim 9 wherein said nitrile monomer is acrylonitrile.

11. The method of claim 10 wherein said comonomer is styrene.

* * * * *

UNITED STATES PATENT AND TRADEMARK OFFICE
CERTIFICATE OF CORRECTION

PATENT NO. : 4,143,108
DATED : March 6, 1979
INVENTOR(S) : I. Luis Gomez, Edward Foden It is certified that error appears in the above-identified patent and that said Letters Patent are hereby corrected as shown below:

Column 4, line 32, after "a" delete "0/30" and insert ---70/30---.

Claim 6, line 33, after "claim" delete "3" and insert ---5---.

Claim 7, line 35, after "claim" delete "3" and insert ---5---.

Signed and Sealed this

Seventeenth Day of July 1979

[SEAL]

Attest:

LUTRELLE F. PARKER
Attesting Officer    Acting Commissioner of Patents and Trademarks